US011407651B2

(12) United States Patent
Steudten et al.

(10) Patent No.: US 11,407,651 B2
(45) Date of Patent: Aug. 9, 2022

(54) WATER PURIFICATION DEVICE HAVING BLADDERLESS ACCUMULATOR AND VIBRATIONALLY-ISOLATED PUMP MOUNT

(71) Applicant: Avidity Science, LLC, Waterford, WI (US)

(72) Inventors: Dietmar Steudten, Oststeinbek (DE); Jeremy Allen, Ingatestone (GB)

(73) Assignee: Avidity Science, LLC, Waterford, WI (US)

( * ) Notice: Subject to any disclaimer, the term of this patent is extended or adjusted under 35 U.S.C. 154(b) by 687 days.

(21) Appl. No.: 16/182,982

(22) Filed: Nov. 7, 2018

(65) Prior Publication Data

US 2019/0135655 A1 May 9, 2019

(30) Foreign Application Priority Data

Nov. 8, 2017 (GB) .................................. 1718485.4

(51) Int. Cl.
| | | |
|---|---|---|
| *B01D 35/26* | (2006.01) | |
| *F04B 43/02* | (2006.01) | |
| *C02F 1/00* | (2006.01) | |
| *C02F 1/42* | (2006.01) | |
| *C02F 1/44* | (2006.01) | |

(52) U.S. Cl.
CPC .............. *C02F 1/003* (2013.01); *B01D 35/26* (2013.01); *F04B 43/02* (2013.01); *B01D 2201/20* (2013.01); *C02F 1/42* (2013.01); *C02F 1/441* (2013.01); *C02F 2201/002* (2013.01); *C02F 2201/006* (2013.01); *C02F 2303/10* (2013.01); *C02F 2307/12* (2013.01)

(58) Field of Classification Search
CPC ............. C02F 1/00; B01D 35/26; F04B 43/02
See application file for complete search history.

(56) References Cited

U.S. PATENT DOCUMENTS

| | | | |
|---|---|---|---|
| 3,955,900 A * | 5/1976 | Vinci ...................... | F04B 39/12 417/361 |
| 5,333,660 A | 8/1994 | Kohlmann et al. | |
| 5,613,373 A | 3/1997 | Grenier | |
| 2015/0075964 A1* | 3/2015 | Kamen ..................... | C02F 1/18 202/180 |

FOREIGN PATENT DOCUMENTS

| | | | |
|---|---|---|---|
| CN | 104912155 A | 9/2015 | |
| CN | 205398315 U | 7/2016 | |
| WO | 2011/046892 A1 | 4/2011 | |
| WO | WO-2011130522 A1 * | 10/2011 | ............. B01D 61/08 |

* cited by examiner

*Primary Examiner* — Hayden Brewster
(74) *Attorney, Agent, or Firm* — Boyle Fredrickson S.C.

(57) ABSTRACT

A water purification device includes a housing having an outlet for dispensing purified water; a filtration system for purifying water, and a pump mounted to the housing and fluidly coupled between the filtration system and the outlet; and a bladderless accumulator coupled to the pump for accumulating the water. The pump is mounted to the housing via a pump mount that is suspended above the housing. The combination of a bladderless accumulator and pump mount ensures that pulsations generated by the pump are greatly reduced.

18 Claims, 5 Drawing Sheets

WATER PURIFICATION DEVICE HAVING BLADDERLESS ACCUMULATOR AND VIBRATIONALLY-ISOLATED PUMP MOUNT

BACKGROUND OF THE INVENTION

1. Field of the Invention

The present invention relates to a water purification device having a bladderless accumulator and a pump mount.

2. Description of the Related Art

Water purification is an important requirement in numerous applications in the chemical, biological and medical fields. Laboratories focused on chemical and biological applications, in particular those that require pure or ultrapure water.

Water purification systems are known and typically utilise several steps to treat water from an inlet to an outlet. Filtration cartridges are typically used, which provide purification using reverse osmosis and/or ion exchange processes.

Typically, incident water, such as tap water, is purified using the cartridges. When a user demands water, the purified water fills a reservoir, utilising UV lamps and further filters to remove organic and inorganic material.

The water pressure is boosted using a pump. However, the pumps used introduce significant vibration and noise to the system, in particular to the tubing and fitting used to transport the purified water.

An alternative system is therefore desired that at least ameliorates the above issues.

SUMMARY OF THE INVENTION

According to a first aspect of the present invention, there is provided a water purification device comprising a housing having an outlet for dispensing purified water; a filtration system for purifying water; and a pump mounted to the housing and fluidly coupled between the filtration system and the outlet, the pump boosting the water. A bladderless accumulator is coupled to the pump for accumulating the water. The pump is mounted to the housing via a pump mount that is suspended above the housing.

The combination of a bladderless accumulator and pump mount ensures that pulsations generated by the pump are greatly reduced. This reduces wear and tear to all components. In particular, oscillation of the tubing and fittings between the pump, the filtration system and the inlet and outlets are greatly reduced. This increases the life of the device.

The accumulator acts as an energy storage device, storing potential energy through the compression of air in a container open to the relatively incompressible water. Accordingly, the accumulator acts to boost the supply of potable water from the device. Whilst a bladderless accumulator allows for relatively maintenance free operation, there is a risk that the accumulator gradually fills with water over time. This is overcome by utilising a one-way valve to allow the inflow of air. This valve is generally formed in the top of the accumulator. This allows the accumulator to be self-draining. In embodiments, the valve is automatically opened when the device in a standby mode.

In some examples, the pump is a diaphragm pump. This reduces bulk compared to alternative pumps.

In some embodiments, the pump mount is formed of a single sheet of metal. This reduces costs and allows the pump mount to be tailored to effectively dampen vibrations from the pump as effectively as possible. In some embodiments, the stiffness of the metal is chosen to maximise damping. In some examples the metal is folded to form a shelf on which the pump is mounted. This reduces part complexity and points of failure. Furthermore, the shelf may be suspended away from the housing. This ensures that the pump mount acts as a suspended spring such that the vibrational frequency of the shelf chosen to counter vibrational modes introduced by the pump.

In some embodiments the pump is vibrationally isolated from the housing—this may be achieved by securing the pump to the pump mount on a surface of the pump mount that is unsecured to the housing. This maximises the counter vibrational effect described above. In alternative or complimentary embodiments, the pump may be isolated by rubber mounts.

It can be appreciated that purified water may be dispensed from the device from a storage tank or reservoir, or the water may be purified on demand.

The filtration system may comprise one or more filter cartridges, the filter cartridges comprising end caps, both end caps having one or more inlets for receiving water to be purified. This allows either end of the filter cartridges to be used, and a single end-cap to be produced, saving costs.

It can be appreciated that, although certain examples and embodiments described above have been primarily described with respect to a single aspect, the features described are also applicable to the other aspects defined herein.

These and other aspects of the invention will be apparent from, and elucidated with reference to, the embodiments described hereinafter. The above discussion is not intended to represent every example embodiment or every implementation within the scope of the current or future claim sets. The Figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

Embodiments will be described, by way of example only, with reference to the drawings, in which.

Figure 1:
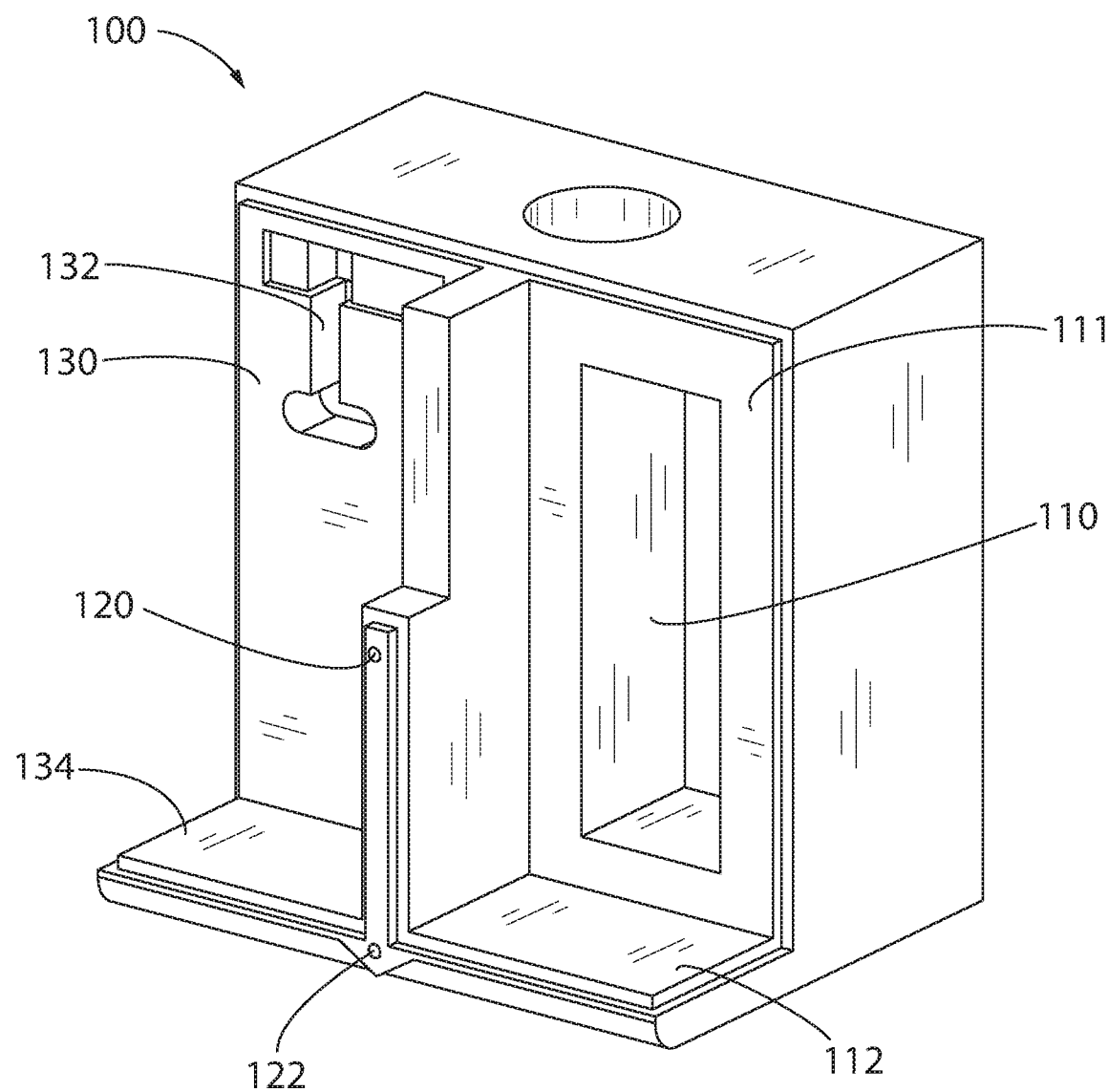
FIG. 1 illustrates a housing for a water filtration system according to the present invention.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION

FIG. 1 shows a housing 100 of a water filtration system, A cover (not shown) may be used to hide one or more of the components mounted thereto. The housing 100 comprises an enclosure or recess 110 for receiving an accumulator 115.

An outlet 120 is provided for dispensing purified water. A water tap or outlet tap 125 (FIG. 4) may be mounted to the outlet 120. A drain 122 is also provided to drain off the system for maintenance. A water tap (not shown) may be fitted to drain 122.

A second enclosure 130 is provided for mounting of a filtration system. Recesses 132 are provided to receive filter cartridges 135. The cartridges 135 sit on a ledge or plinth 134.

Figure 2:
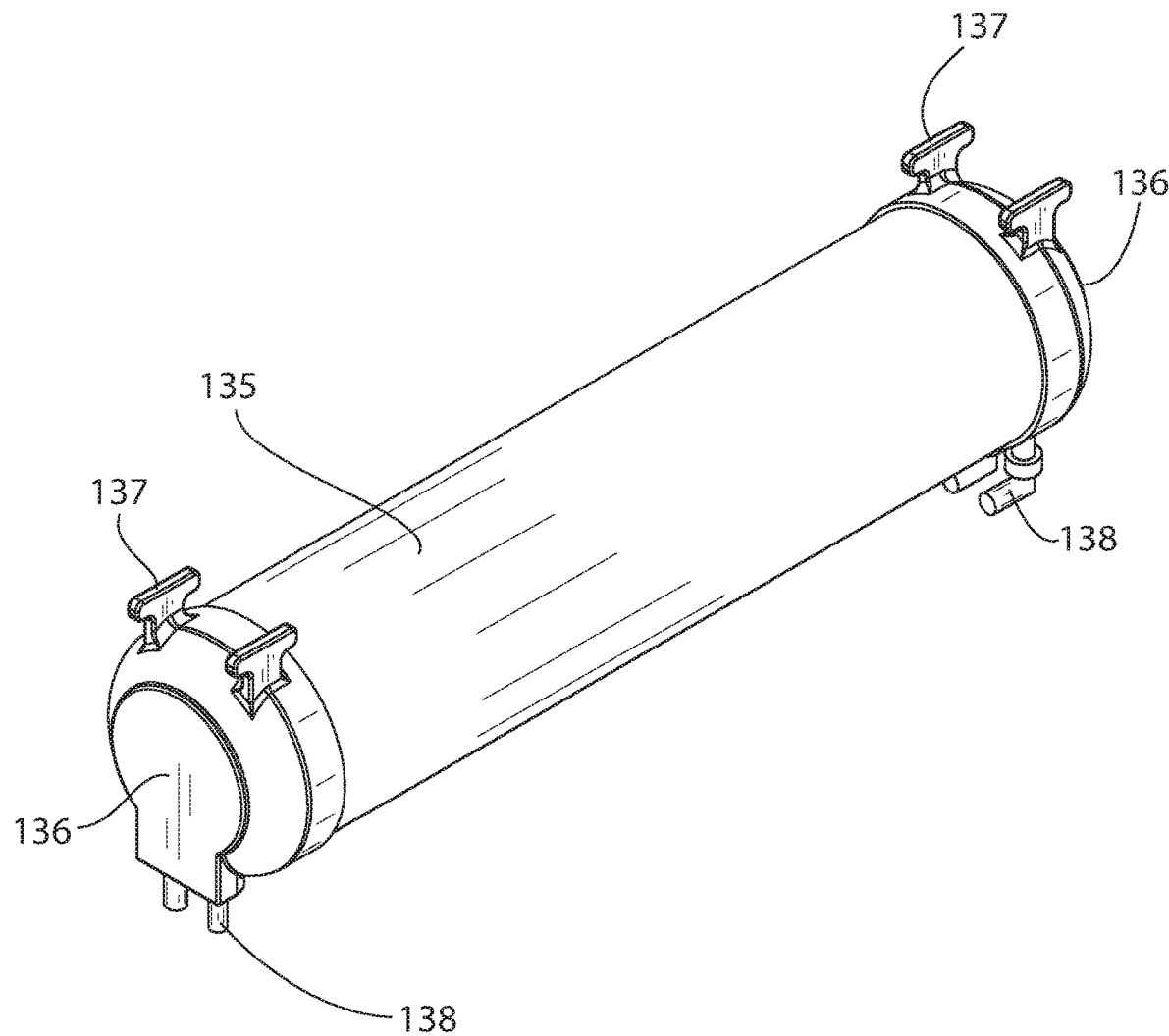
FIG. 2 illustrates a cartridge for use with the water filtration system of FIG. 1.

FIG. 2 shows a filter cartridge 135 that forms part of a water filtration system. The cartridge 135 may utilise reverse osmosis or an ion exchange resin to perform purification of water. The cartridges comprise a main body which may contain channels or other purification structures that are well known in the art. End caps 136 provide mounting structures 137 for engagement with recesses 132 of the housing. Additionally, inlets 138 are provided in the end caps. Inlets may be pierced by one or more tubes or pipes (not shown) and water to be purified supplied to the inlets for filtration and/or purification by the cartridges 135. As shown, the inlets 138 may also have connectors, such as right-angle connectors attached thereto. Valves or taps may also be used.

Figure 3:
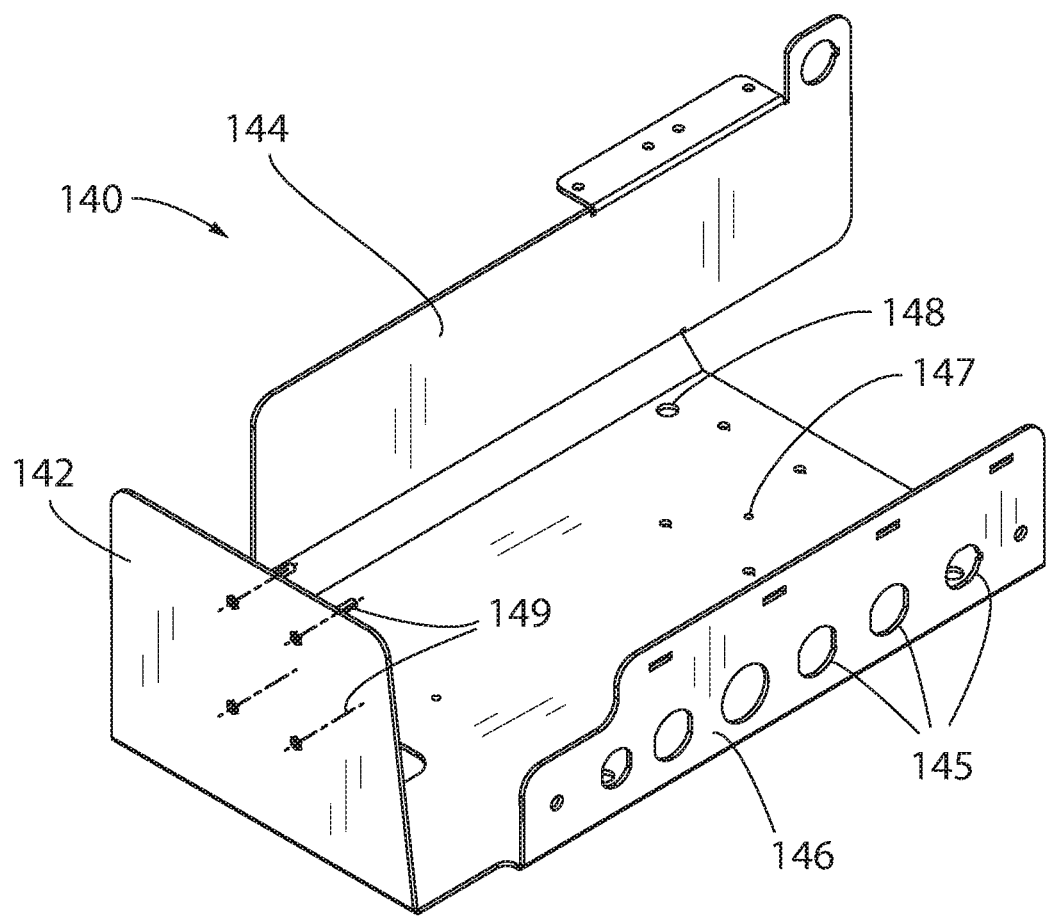
FIG. 3 shows a pump mount for mounting on the housing of FIG. 1.

FIG. 3 shows a pump mount 140 for attachment to the housing. The pump mount 140 is configured to be attached to a front surface 111 of the enclosure 110 via screws or the like at points 148. The accumulator 115 is secured to the rear surface of the pump mount 140 at point 147.

A first side 144 of pump mount is configured to sit within recess 110, whilst a second side 146 is provided with electrical sockets 145 for receiving one or more electrical connectors and connections.

The pump mount 140 is typically formed of a single sheet of metal and comprises a lower shelf 142 onto which a pump 150 is mounted. Mounting screws 149 are provided. It may be appreciated that a mounting plate 152 and grommets or rubber mounts 154 may also be provided.

Pump mount 140 is configured to hold the pump 150 on the shelf 142 above a shelf or plinth 112 of the housing 100. The pump mount 140 is not attached to the plinth 142 such that the pump 150 is suspended above the plinth. Accordingly, the shelf 142 acts as a sprung dampener, reducing oscillations from the pump 150 during use.

Figure 4:
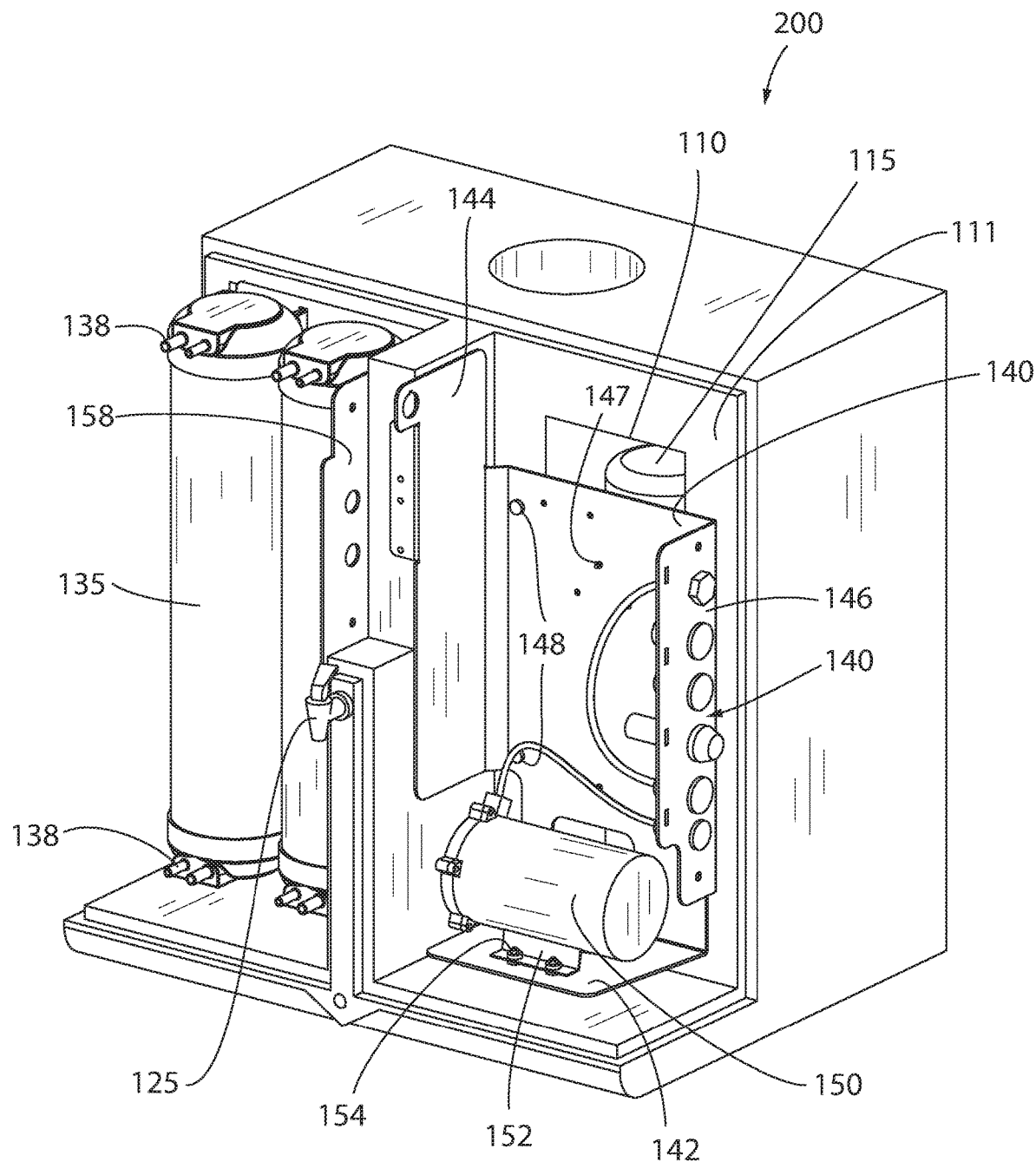
FIG. 4 shows the housing of FIG. 1 with the pump mount of FIG. 3 attached.

FIG. 4 shows the assembled purification system 200 with pump mount 140 assembled within the housing 100. Accumulator 115 is located within recess 110 and pump 150 is located on shelf 142 via plate 152 and connector 154. In use, vibrations from the pump 150 are dampened by the pump mount 140 due to the pump being suspended above plinth 112 away from the housing. It may be appreciated that tailoring the materials of the pump mount may account for different vibrational characteristics of the pump.

Figure 5:
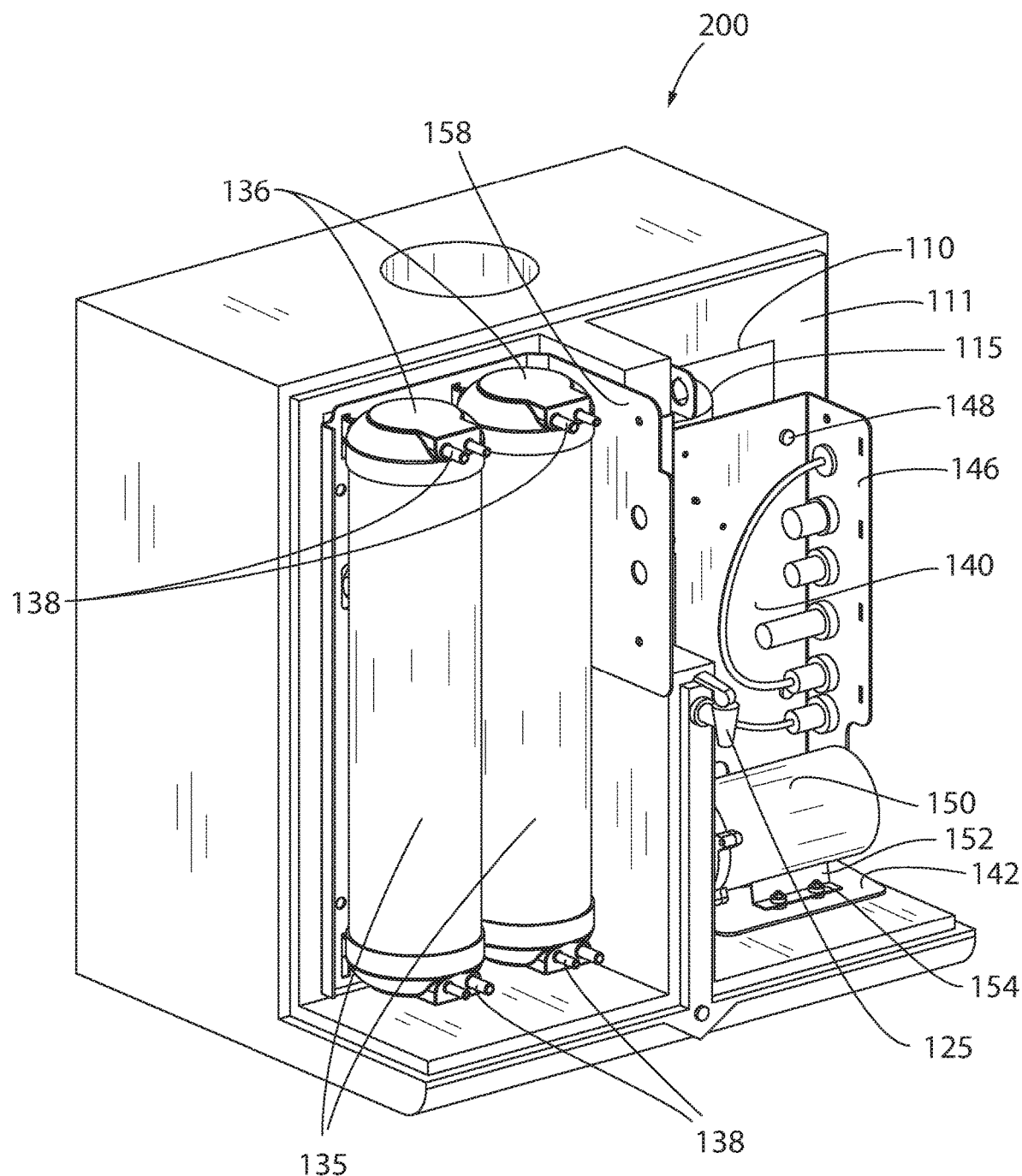
FIG. 5 shows the housing of FIG. 1 with the cartridges of FIG. 2 attached.

For completeness, FIG. 5 shows the cartridges 135 mounted to the housing 100. A rear mounting plate 158 is used to further secure the cartridges. In use, a supply of water to be purified is connected to inlets 138 of end caps 136 of the cartridges. Once passed through the cartridges 135, the water is purified. Accumulator 115 may then be used to dispense the water through outlet tap 125 without use of the pump 150, or if a higher amount of water is required or the accumulator has insufficient pressure, pump 150 may be used to pump the water to the dispenser 125. In such circumstances, the vibration caused by the pump 150 is dampened by the accumulator 115.

Accumulator 115 is generally a bladderless accumulator and is provided with a one-way air valve, generally at the top of the accumulator that is configured to allow air into the accumulator to reduce water level in the accumulator when the device is in a standby mode such that the device is self-draining. It can further be appreciated that in embodiments the purified water may be supplied from a tank or reservoir where the purified water is stored.

From reading the present disclosure, other variations and modifications will be apparent to the skilled person. Such variations and modifications may involve equivalent and other features which are already known in the art of building cladding structures, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness, it is also stated that the term "comprising" does not exclude other elements or steps, the terms "a" or "an" do not exclude a plurality, and reference signs in the claims shall not be construed as limiting the scope of the claims.

What is claimed is:
1. A water purification device comprising:
 a housing having an outlet for dispensing purified water, the housing having a plinth;
 a filtration system for purifying water to produce the purified water;
 a pump mounted to the housing, said pump pumping the purified water;
 a bladderless accumulator, coupled to the pump and the filtration system, for accumulating the purified water, wherein the bladderless accumulator is configured to act as an energy store device that stores potential energy through the compression of air therein; and
 wherein the pump is mounted to the housing via a pump mount, said pump mount being mounted on a wall of the housing so as to be suspended above the plinth of the housing.

2. The water purification device of claim 1, wherein the bladderless accumulator further comprises a one-way valve configured to allow air to flow into the bladderless accumulator to drain the bladderless accumulator.

3. The water purification device of claim 1, wherein the pump is a diaphragm pump.

4. The water purification device of claim 1, wherein the pump mount is formed of a single sheet of metal that is folded to form a shelf on which the pump is mounted.

5. The water purification device of claim 4, wherein the shelf is suspended vertically above the plinth of the housing.

6. The water purification device of claim 1, wherein the pump mount is attached to the wall of the housing so as to be vibrationally isolated from the wall of the housing.

7. The water purification device of claim 6, wherein the pump is vibrationally isolated from the housing by rubber mounts located between the pump mount and the wall of the housing.

8. The water purification device of claim 6, wherein the pump mount includes a shelf that acts as a suspended spring in which a vibrational frequency of the shelf counters vibrational modes introduced by the pump.

9. The water purification device of claim 1, wherein the bladderless accumulator automatically self-drains when the device is in a standby mode.

10. The water purification device of claim 1, wherein the filtration system comprises one or more filter cartridges, the filter cartridges comprising end caps, both end caps having one or more inlets for receiving water to be purified.

11. The water purification device of claim 6, wherein the bladderless accumulator is mounted on the pump mount.

12. The water purification device of claim 11, wherein the housing further comprises an enclosure in which the bladderless accumulator is located, the enclosure having a front surface which is located in front of the bladderless accumulator and to which the pump mount is secured.

13. A water purification device, comprising:
a housing having an outlet for dispensing purified water, the housing having a horizontal plinth and a vertical wall extending upwardly from the plinth;
a filtration system for purifying unpurified water to produce the purified water;
a pump mount that is attached to the vertical wall of the housing so as to be vibrationally isolated from the housing;
a pump that is supported on the pump mount, said pump pumping the purified water;
a bladderless accumulator, coupled to the pump and the filtration system, for accumulating the purified water, wherein the bladderless accumulator is configured to act as an energy store device that stores potential energy through the compression of air therein.

14. The water purification device of claim 13, wherein the pump mount includes a shelf that acts as a suspended spring in which a vibrational frequency of the shelf counters vibrational modes introduced by the pump.

15. The water purification device of claim 14, wherein the pump mount is formed of a single sheet of metal that is folded to form the shelf and that is attached to the vertical wall of the housing by a rubber mount.

16. The water purification device of claim 13, wherein the housing further comprises an enclosure in which the bladderless accumulator is located, the enclosure having a front surface to which the pump mount is secured.

17. The water purification device of claim 16, wherein the bladderless accumulator is mounted on the pump mount.

18. The water purification device of claim 13, wherein the bladderless accumulator comprises a one-way valve configured to allow air to flow into the bladderless accumulator.

* * * * *